United States Patent
Trainin

(10) Patent No.: US 8,363,627 B2
(45) Date of Patent: Jan. 29, 2013

(54) MODULATION CODING SCHEMES FOR CONTROL FRAME TRANSMISSION UNDER 802.11N

(75) Inventor: Solomon Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 962 days.

(21) Appl. No.: 11/764,838

(22) Filed: Jun. 19, 2007

(65) Prior Publication Data
US 2008/0316981 A1 Dec. 25, 2008

(51) Int. Cl.
H04B 7/185 (2006.01)
H04W 4/00 (2009.01)
H04W 40/00 (2009.01)
H04L 12/413 (2006.01)

(52) U.S. Cl. ........ 370/338; 370/318; 370/445; 455/445; 455/13.4

(58) Field of Classification Search ............... 455/422.1, 455/426.1, 445, 464, 13.4, 24, 41.2, 41.3, 455/517, 522, 88, 552.1, 553.1; 370/318, 370/322, 329–330, 338, 341, 348, 350
See application file for complete search history.

(56) References Cited

U.S. PATENT DOCUMENTS

| | | | |
|---|---|---|---|
| 2006/0280155 A1* | 12/2006 | Kwon et al. | 370/338 |
| 2007/0010237 A1* | 1/2007 | Jones et al. | 455/422.1 |
| 2007/0133447 A1* | 6/2007 | Wentink | 370/310 |
| 2007/0291913 A1 | 12/2007 | Trainin | |

* cited by examiner

Primary Examiner — Wesley Kim
(74) Attorney, Agent, or Firm — Carrie A. Boone, P.C.

(57) ABSTRACT

A control frame transmission algorithm is disclosed for 802.11n devices operating in a wireless neighborhood that includes both high-throughput (HT) devices and non-high throughput devices. The control frame transmission algorithm establishes the characteristics of a control frame initiated by the station, as well as the characteristics of a response control frame, which is sent in response to a frame received from another station. These characteristics include the PHY protocol data unit format, the transmission rate, and modulation coding scheme to be used.

9 Claims, 6 Drawing Sheets

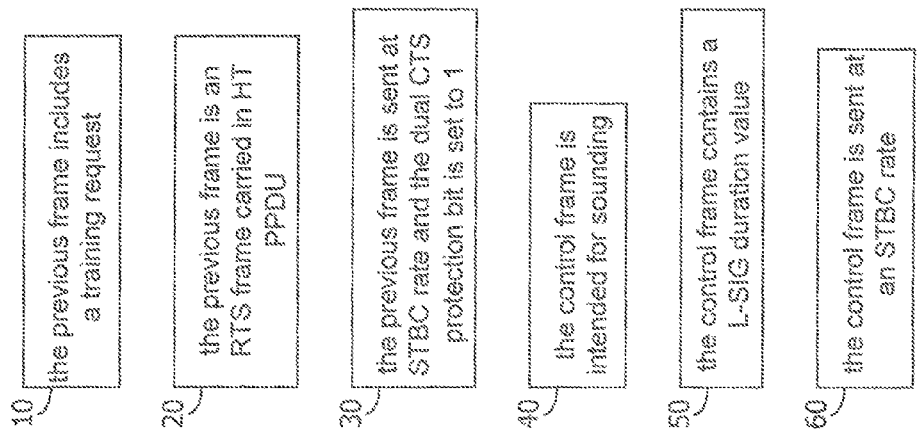
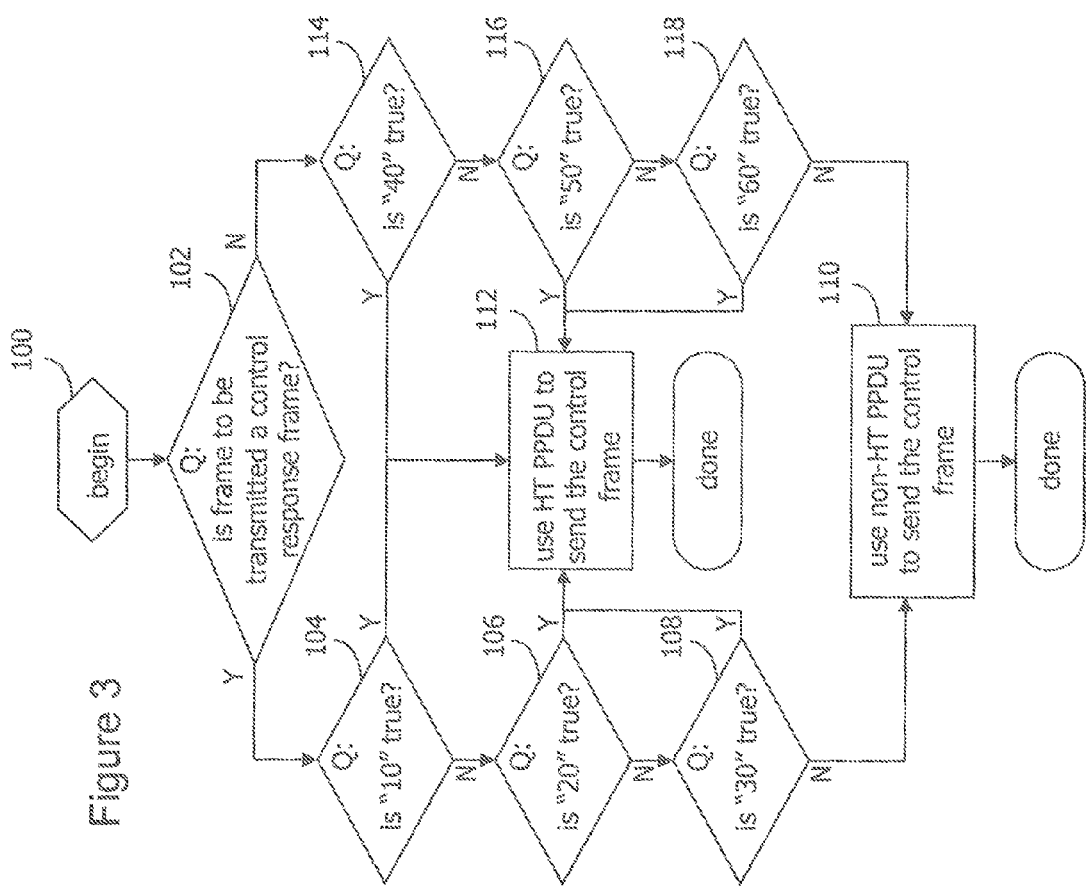
Figure 3

MODULATION CODING SCHEMES FOR CONTROL FRAME TRANSMISSION UNDER 802.11N

TECHNICAL FIELD

This application relates to wireless transmission and, more particularly, to transmission of control frames under the 802.11n wireless standard.

BACKGROUND

The Institute of Electrical and Electronics Engineers (IEEE) has adopted a set of standards for wireless local area networks (LANs), known as 802.11. Wireless products satisfying 802.11a, 802.11b, and 802.11g are currently on the market, for example.

Recently, an 802.11n standard, known also as the Enhancement for High Throughput wireless standard, has emerged. Under the 802.11n standard, transmitters and receivers each have multiple antennas for transmission and reception of data. As a multiple input, multiple output (MIMO) technology, 802.11n is designed to coordinate multiple simultaneous radio signals, and is expected to support a bandwidth of greater than 100 megabits per second (Mbps). In addition to MIMO, the 802.11n standard includes other features to increase throughput.

MIMO techniques supported by 802.11n include spatial multiplexing, beamforming, and channel training. Spatial multiplexing works by dividing the transmission, known as a frame, into different streams and sending them over multiple paths in the channel, using the multiple radios. At the receiver, the different streams are recombined to get the originally transmitted frame. Beamforming is a technique in which the transmitter and receiver use sounding to obtain an optimal transmission path. Multiple directional antennas are used to spatially shape the emitted transmission to beam the energy into the receiver over the optimal transmission path. Channel training, such as sounding, is a kind of measurement that allows a transmitter to know about the channel between the transmitter and the receiver. In a handshaking operation, the transmitter sends special frames to the receiver, which direct the receiver to measure or estimate the channel. The receiver sends the estimation data back to the transmitter, such that both the transmitter and receiver are trained as to the channel characteristics.

A wireless local-area network, or WLAN, consists of a number of nodes, known as access points (APs) and client stations (STA). The nodes communicate with one another using frames. Where the nodes operate under 802.11n, they may operate in one of three modes: legacy (802.11a, b, and g), mixed mode (802.11n and legacy), or Greenfield (802.11n only). When sending frames to another node, the node is a transmitter; when receiving frames from another node, the node is a receiver. Transmissions on the wireless network are random (pseudo-random) access.

Each node communicates with another node according to one or more data rates supported by the receiver. Each node may have its own supported data rate set. A subset of the supported data rates at which each node associated in the same basic service set (BSS) may transmit and receive frames is called the Basic Rate Set for that BSS.

In earlier versions of 802.11, transmissions occurred according to data rates specified in the basic rate set. In 802.11b, for example, the supported data rates are 1, 2, 5.5, and 11 Megabits per second (Mbps), in the 2.4 Gigahertz (GHz) frequency band. In 802.11a, the supported data rates are 6, 9, 12, 18, 24, 36, 48, and 54 Mbps, in the 5.2 GHz frequency band. For 802.11g, the supported data rates are 1, 2, 5.5, 6, 9, 11, 12, 18, 24, 36, 48, and 54 Mbps, in the 2.4 GHz frequency band. The basic rate set reflects these supported data rates. Devices supported by these standards may automatically adapt their data rates, based on channel conditions.

The different standards also are characterized by different modulation techniques. 802.11b devices use direct sequence spread spectrum (DSSS) while 802.11a devices employ orthogonal frequency division multiplexing (OFDM). 802.11g devices employ a combination of the 802.11a and 802.11b modulation techniques.

For 802.11n, the transmission rates are considerably more complex. A modulation coding scheme (MCS) is used to specify the transmission rate. MCS includes variables for the modulation scheme, the number of spatial streams, and the data rate on each stream. The number of spatial streams is based on the number of antennas, with up to four antennas supported. For nodes on the network to communicate with one another, a negotiation takes place between them to determine the optimum MCS based on the present channel conditions. The MCS is continuously adjusted as the channel conditions change. There exist 77 modulation coding schemes specified in the latest 802.11n draft (as of January, 2007), with eight of them being mandatory.

Under 802.11, when a transmitter sends a frame, the receiver sends an acknowledge frame, known as ACK frame. The frame transmitted may include data, and may be transmitted at a high rate. The response frame (ACK) may be transmitted at a much slower rate. Frames transmitted at a lower rate generally have better propagation, that is, the low rate frames travel farther, and thus may reach more nodes in the wireless network.

The 802.11 standard also defines a number of control frames used for different purposes. Control frames for collision avoidance, protection of sequences of data frames, acknowledgement, and polling, for example, are available under the new standard. Most of the control frames are sent at one of the rates specified in the basic rate set of the node transmitting the control frames.

The new features of the 802.11n standard extend the usage of the control frames for more purposes: requesting different types of feedback and responding with feedback. Examples of such a request/response are: modulation coding scheme (MCS) request and response, explicit feedback (EF) request and response, implicit feedback (IF) request and response, and so on.

The MCS request is sent so that the transmitter can obtain the optimum supported rate of the receiver. The criteria used to send the MCS request is different from the criteria used to send other control frames. The 802.11n standard employs a receiver assisted link adaptation protocol, in which the transmitter sends an MCS request, and the receiver measures the characteristics of the link between the transmitter and receiver. The receiver then sends an MCS response, which includes the recommended MSC to be used by the transmitter.

The control frames are used in the 802.11n standard for the same purposes as in the previous (legacy) versions of the 802.11 specification. However, the control frames are also used for new functions. In some cases, there is conflict between the control frame requirements of the legacy standard and the 802.11n standard.

As one example, the legacy approach for transmitting all the control frames except a block ACK request (BAR) and block ACK (BA) by one of the basic rates and the BAR/BA by supported rates cannot be used for the high-throughput standard. For example, a high-throughput (HT) station is associated with a HT access point (AP). The AP transmits data using transmit beamforming, but the HT station does not use transmit beamforming. If the AP sends a BAR by the rate it uses for data transmission and the station responds with BA by the same rate, following the existing rule, this response will not succeed.

As another example, if a transmitting station wants to determine an optimum MCS rate for communicating with a receiving station, the transmitting station sends an MCS feedback request to the receiving station, preferably using MIMO transmission for the request. Optimally, the MCS feedback obtained is used in a subsequent control frame transmitted by the transmitting station. The MCS request may be sent by a request-to-send (RTS) frame, and getting a response, together with a clear-to-send (CTS) frame, and using the responded MCS by transmission of the first data frame.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

FIG. 3 is a flow diagram of PPDU format selection performed by the control frame transmission algorithm of FIG. 1, according to some embodiments;

DETAILED DESCRIPTION

In accordance with the embodiments described herein, a control frame transmission algorithm is disclosed. With the latest 802.11n devices supporting high-throughput (HT) and legacy data rates, the control frame transmission algorithm establishes the characteristics of a control frame initiated by the station, and the characteristics of a response control frame, based on a frame received from another station. These characteristics include the PPDU format, the transmission rate, and MCS computation.

In the following detailed description, reference is made to the accompanying drawings, which show by way of illustration specific embodiments in which the invention may be practiced. However, it is to be understood that other embodiments will become apparent to those of ordinary skill in the art upon reading this disclosure. The following detailed description is, therefore, not to be construed in a limiting sense, as the scope of the present invention is defined by the claims.

Figure 1:
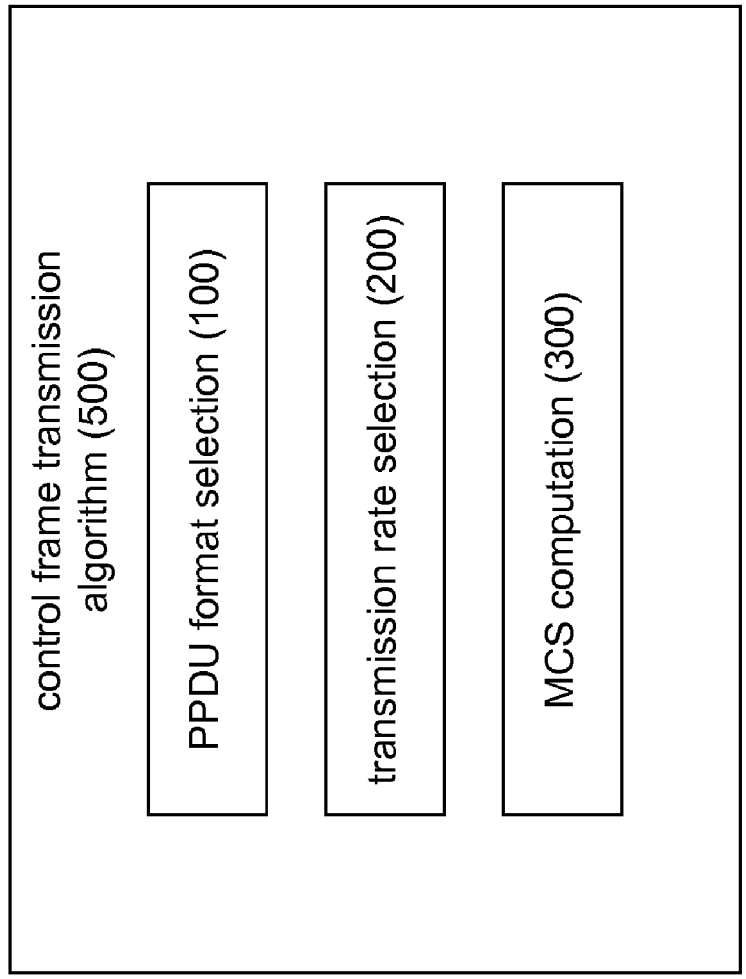
FIG. 1 is a block diagram of a control frame transmission algorithm, according to some embodiments.

FIG. 1 is a block diagram of a control frame transmission algorithm 500, for choosing characteristics for successful control frame transmission by 802.11n stations and access points, according to some embodiments. The algorithm 500 includes PPDU format selection 100, transmission rate selection 200, and MCS computation 300. These routines, which analyze the previously transmitted frame, ensure that the control frame transmission back to the transmitting entity is successful.

PPDU Format Selection

A protocol data unit (PDU) is information conveyed to a node on the network, which may contain control, address, and data. A PHY PDU (PPDU) is a PDU for the physical layer; a MAC PDU (MPDU) is a PDU for the media access control (MAC) layer. The PPDU format selection 100 determines whether a control response frame is to be a high-throughput (HT) PPDU transmission or a non-HT PPDU (legacy) transmission.

Figure 2:
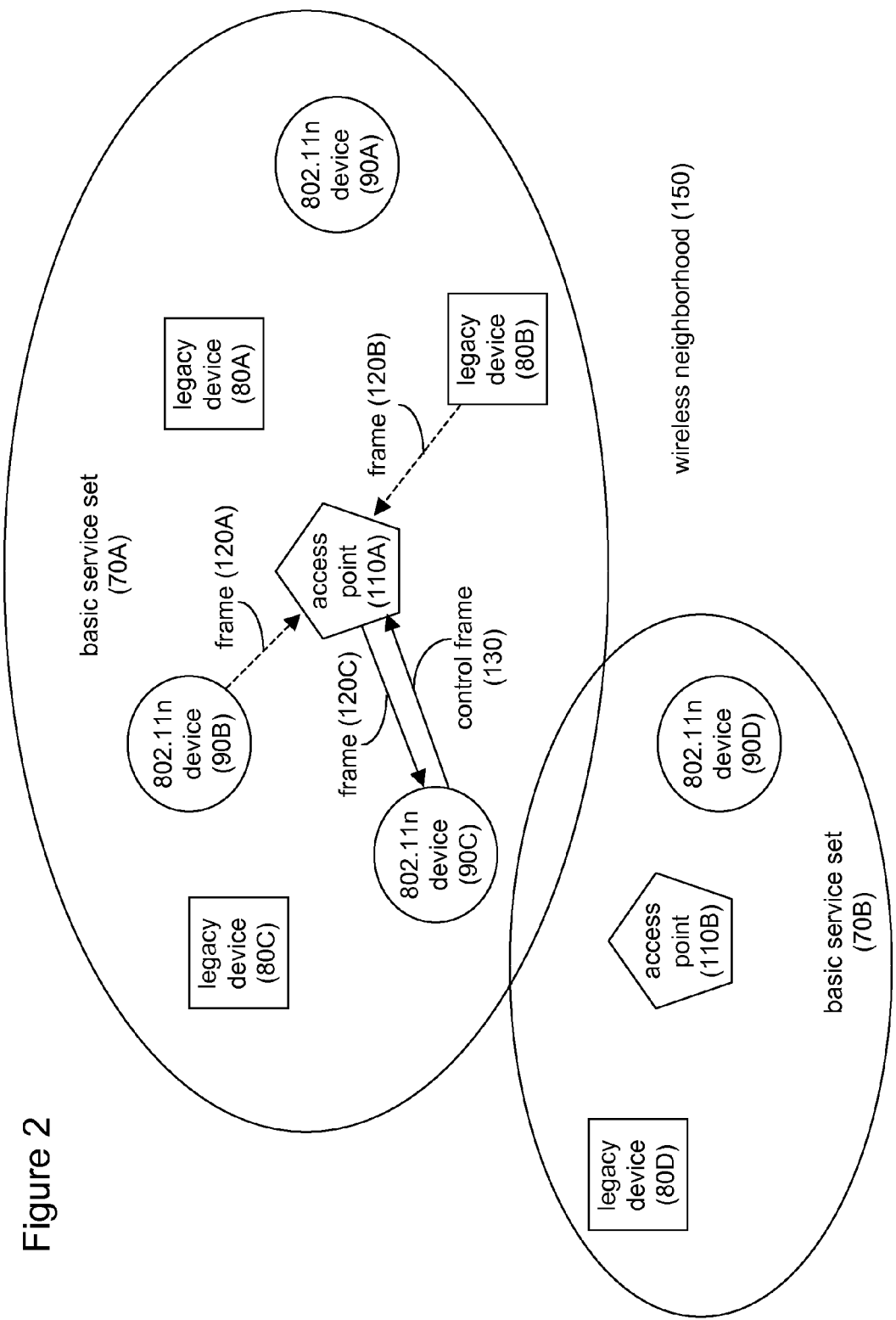
FIG. 2 is a block diagram of a wireless neighborhood, including access points, legacy devices, and 802.11n devices, according to some embodiments.

FIG. 2 is a schematic block diagram of a wireless neighborhood 150, including two partially overlapping basic service sets (BSS) 70A and 70B (collectively, BSSs 70). Each BSS 70 has a single access point, one or more legacy devices (e.g., non-HT devices), and/or one or more 802.11n devices (e.g., HT devices). The BSS 70A includes an access point 110A, legacy devices 80A, 80B, and 80C, and 802.11n devices 90A, 90B, and 90C. The BSS 70B includes access point 110B, legacy device 80D, and 802.11n device 90D. There is some overlap between BSS 70A and BSS 70B, and the wireless neighborhood 150 may include many such BSSs. The 802.11n devices may be either mixed mode devices or Green Field devices. Collectively, the entities in FIG. 2 may be described herein as access points 110, basic service sets (BSS) 70, legacy devices 80, and 802.11n devices 90, where the legacy devices 80 are non-HT devices and the 802.11n devices 90 are HT devices.

The access points 110 may supply a gateway to another network for the legacy and 802.11n devices. For example, the legacy devices 80 or the 802.11n devices 90 may access the Internet by going through their respective access points 110. Communication between wireless devices also goes through the access points 110. Thus, when the 802.11n device 90B wishes to communicate with the legacy device 80C, the device 80B first communicates with the access point 110A. Alternatively, the 802.11n device 90B may communicate with the legacy device 80C using a direct link setup (DLS).

In FIG. 2, a frame 120C is transmitted from the access point 110A to the 802.11n device 90C. In this instance, the 802.11n device 90C is a receiving station. It is unclear whether the frame 120C came from the 802.11n device 90B (shown as frame 120A) or from the legacy device 80B (shown as frame 120B), one of which is the transmitting station. The frame 120C is to be analyzed by the control frame transmission algorithm 500 before the receiving station may transmit a control frame 130 in response, also known as a control response frame. The frame 120C sent to the receiving station 90C may be referred to herein as the frame eliciting the response, the previously transmitted frame, or the previous frame. Where the frame 120C is referred to as the previously transmitted or previous frame, it is understood that, from the perspective of the receiving station 90C, the frame 120C is the most recent frame received.

The control frame transmission algorithm 500, executing on the 802.11n device 90C, analyzes the previous frame 120C before deciding on the characteristics of the control response frame 130. From this analysis, the algorithm 500 determines the PPDU format, the transmission rate, and the MCS computation for the control response frame 130.

In addition to responding to frames sent by other devices, the 802.11n device 90C may initiate a transmission to another device in the wireless neighborhood 150 of its own accord. In this case, the control frame 130 shown in FIG. 2 is not a control response frame, but merely a control frame 130 initiated by the 802.11n device 90C. Accordingly, where the 802.11n device 90C executes the control frame transmission algorithm 500, the PPDU format selection routine 100 determines whether the station 90C is initiating a transmission to another device of its own accord (that is, not in response to a received frame) or is responding to a frame received from another device in the wireless neighborhood 150. In the first case, the device 90C transmits a control frame 130, in the second case, the device 90C transmits a control response frame 130. The transmission rate selection 200 and the MCS computation 300 routines pertain only to control response frames.

FIG. 3 is a flow diagram of the PPDU format selection 100 of the control frame transmission algorithm 500, according to some embodiments. For an initiating device (e.g., the device 90C illustrated in FIG. 2), the PPDU format selection 100 determines whether to transmit the control frame 130 using the HT PPDU format or the non-HT PPDU format, for two different circumstances: when the control frame is initiated by the device 90C and when the device is in response to receiving the control frame 120C from another device in the wireless neighborhood 150. Since the PPDU format selection 100 is a sequence of inquiries, the flow diagram is presented in a simplified "true or false" format, with the specific questions indicated on the right side of FIG. 3, and labeled 10, 20, 30, 40, 50, and 60. With HT-PPDU, the frame is sent using MIMO format, as there are multiple spatial streams. The big difference between HT PPDU and non-HT PPDU is the type of preamble.

The PPDU format selection 100 first determines whether the the frame to be transmitted is a control frame (e.g., self-initiated) or a control response frame (e.g., in response to the previous frame 120C transmitted (block 102). The control response frame may be an acknowledge frame (ACK), a block ACK, or some other control frame. Where the control frame 130 to be transmitted is not in response to a previously received frame (the "no" prong of block 102), the PPDU format selection algorithm 100 analyses the control frame to be transmitted. When the control frame 130 to be transmitted is a control response frame (the "yes" prong of block 102), the PPDU format selection algorithm 100 analyzes the previously received frame 120C. In either case, the algorithm 100 proceeds with three questions, known as the "previous frame high-throughput characteristics". Although these inquiries are presented in a particular order in FIG. 3, the questions may be asked in a different sequence than is shown.

Where the control frame 130 is not a control response frame, the analysis is limited to the desired characteristics of the control frame. The algorithm 100 inquires whether the control frame 130 is intended for sounding (block 114). Sounding is a feature of the HT PPDU. The control frame 130, for example, may have a NOT_SOUNDING bit deselected, to indicate support of the sounding feature. If the control frame 130 is intended for sounding, then HT PPDU is used to transmit the control frame (block 112). Otherwise, further inquiry is made by the PPDU format selection 100 (the "no" prong of block 114).

The PPDU format selection 100 inquires whether the control frame 130 contains a legacy signal (L-SIG) duration value (block 116). The control frame 130 has an L-SIG duration field, short for legacy signal field, which is part of the frame format. The L-SIG duration value provides the length, or time duration, of the frame. If the control frame 130 contains an L-SIG duration value, the control frame 130 is transmitted using HT PPDU (block 112). Otherwise, the PPDU format selection 100 makes further inquiry (the "no" prong of block 116).

The PPDU format selection 100 inquires whether the control frame 130 is to be transmitted at a spatial timing block coding (STBC) rate (block 118). The control frame 130 has an STBC rate field, which specifies a type of modulation used only in the HT PPDU. If the STBC rate is set, the control frame 130 is transmitted using HT PPDU (block 112). Otherwise, the PPDU format selection 100 makes no further inquiries, as the control frame 130 is determined to be a non-HT control frame. Accordingly, the PPDU format selection 100 transmits the control frame 130 at the non-HT PPDU (legacy) rate (block 110).

Where the control frame 130 is determined to be a control response frame (the "yes" prong of block 102), the PPDU format selection 100 proceeds with three different questions than for the self-initiated control frame, known as the "control frame high-throughput characteristics". The questions 10, 20, and 30 relate to the characteristics of the previously transmitted frame, e.g., the frame 120C transmitted by another device in the wireless neighborhood 150.

The PPDU format selection 100 inquires whether the previous frame 120C is a training request (block 104). The previous frame 120C may be characterized by an HT control field with a training request (TRQ) bit set, a no data packet (NDP) announcement bit cleared, and an implicit transmit beamforming (TXBF) bit set, for example. Where the training request is made, the control response frame 130 includes sounding. Where the previous frame 120C is a training request (the "yes" prong of block 104), HT PPDU is used to transmit the control response frame 130 (block 112) because the HT PPDU has the format to enable the training request while the non-HT PPDU does not.

Otherwise, the PPDU format selection 100 inquires whether the previous frame 120C is a request-to-send (RTS) frame carried in the HT PPDU format (block 106). If so, the control response frame 130 is transmitted using the HT PPDU format (block 112). Otherwise, the PPDU format selection 100 makes a final inquiry (the "no" prong of block 106).

The PPDU format selection 100 inquires whether the previous frame 120C is sent at the STBC rate and the dual clear-to-send (CTS) protection bit is set (block 108). If so, the previous frame 120C was transmitted at HT PPDU, thus, the control response frame 130 is transmitted at the HT PPDU rate (block 112). Otherwise, the control response frame 130 is transmitted at the non-HT PPDU rate (block 110).

The PPDU format selection 100 of the control frame transmission algorithm 500 thus sets the format, whether HT PPDU or non-HT PPDU, of the control frame 130 based whether a previous frame was transmitted or not, and, if a previous frame was transmitted, on characteristics of the previous frame. Once these circumstances are known, the control frame transmission algorithm 500 further determines the transmission rate, using the transmission rate selection 200, and the MCS rate, using the MCS computation algorithm 300, both of which are described further below.

Transmission Rate Selection

Figure 4:
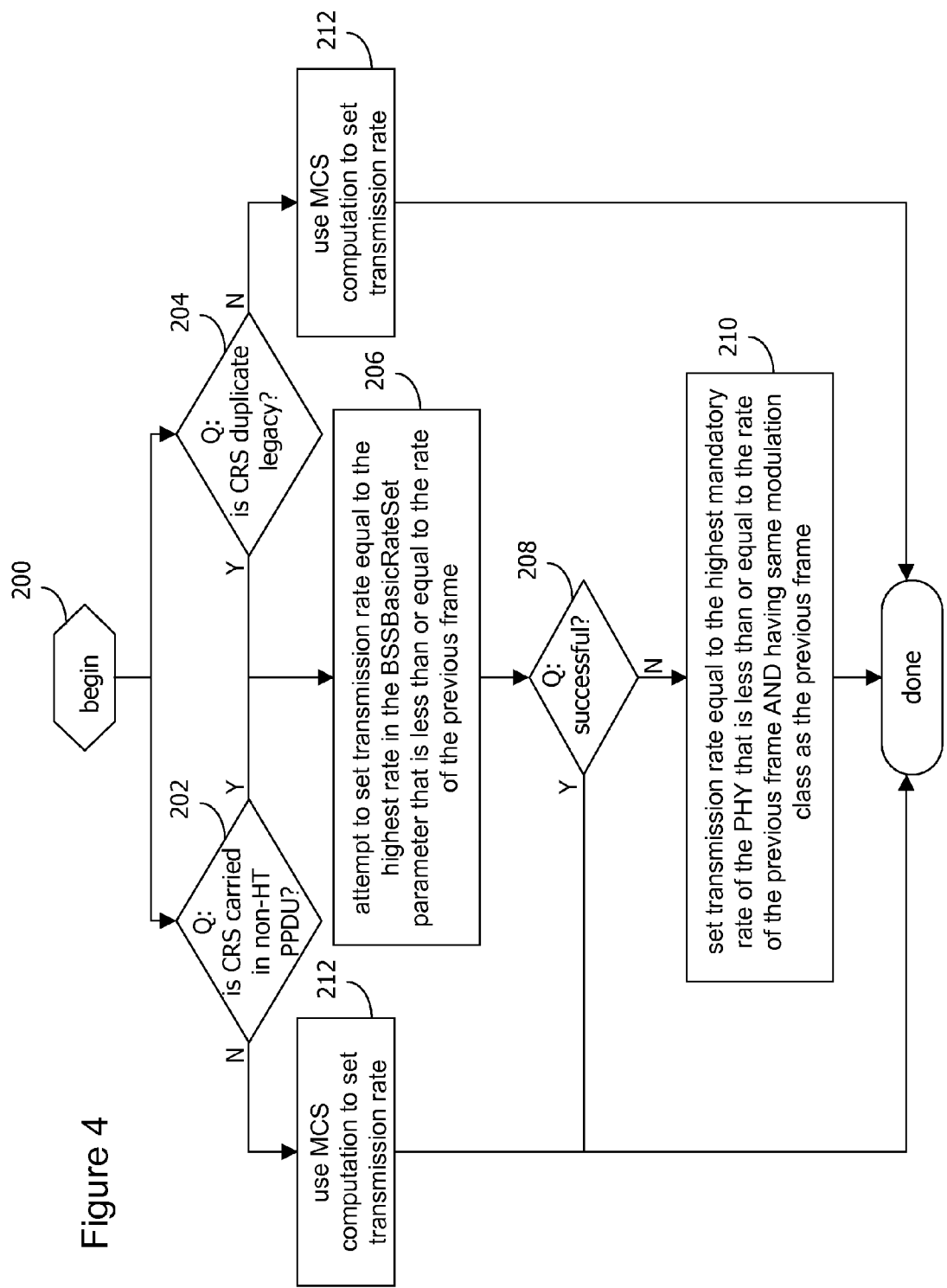
FIG. 4 is a flow diagram of transmission rate selection performed by the control frame transmission algorithm of FIG. 1, according to some embodiments.

The control frame transmission algorithm 500 also includes transmission rate selection 200. FIG. 4 is a flow diagram depicting operation of the transmission rate selection 200, to determine the transmission rate of the response frame (e.g., the response frame 130 in FIG. 2). The transmission rate selection routine 200 uses some of the information obtained by the PPDU format selection routine 100 in deriving an appropriate transmission rate of the response frame.

Recall from FIG. 3 that the control frame 130 to be transmitted is first analyzed as being in response to a previous frame received (a control response frame) or as being self-initiated (a control frame). Where the control frame 130 is a control response frame, the frame may be a CTS, ACK, or an immediate block acknowledge (BlockACK), including a response to an implicit block acknowledge request. If the control frame 130 is deemed not to be a control response frame, then the transmission rate selection routine 200 is not executed. The transmission rate selection routine 200 thus pertains only to transmission of control response frames by the transmitting device 90C (see the left side of the flow diagram 100 in FIG. 3).

In the transmission rate selection routine 200 (FIG. 4), two inquiries are made about the control response frame (CRS) 130. The routine 200 asks whether the CRS 130 is carried in a non-HT PPDU (block 202, see also block 110 of FIG. 3), or whether the CRS is "duplicate legacy" (block 204). A "duplicate legacy" CRS is one in which data is transmitted simultaneously over two adjacent 20 MHz channels. If either condition is true, the transmission rate selection routine 200 attempts to set the transmission rate of the control response frame equal to the highest rate in the basic rate set parameter of the BSS (e.g., the BSS 70A in FIG. 2) that is less than or equal to the transmission rate of the previous frame (block 206).

If successful, the transmission rate selection 200 is complete. However, it may be the case that no rate in the basic rate set parameter of the BSS meets this condition (the "no" prong of block 208). Accordingly, the transmission rate selection 200 sets the transmission rate of the control response frame equal to the highest mandatory rate of the PHY that is less than or equal to the transmission rate of the previous frame, with the transmission rate further has the same modulation class as the previous frame (block 210). Thus, the transmission rate for the control response frame is set.

Where the control response frame is not carried in a non-HT PPDU (the "no" prong of block 202), nor is the control response frame duplicate legacy (the "no" prong of block 204), then MCS computation is used to set the transmission rate (block 212). In this case, control thus proceeds to the next part of the control frame transmission algorithm 500, the MCS computation routine 300.

MCS Computation

Each part of the control frame transmission algorithm 500 further filters the characteristics of the previous frame. Recall that the transmission rate selection 200 is executed when the control frame 130 is a control response frame (e.g., in response to a previous frame 120C). Further, the MCS computation 300 is executed when the control response frame 130 is deemed to not have been carried in a non-HT PPDU (the "no" prong of block 202 in FIG. 4) or has not been deemed to be duplicate legacy (the "no" prong of block 204 in FIG. 4).

Figure 5:
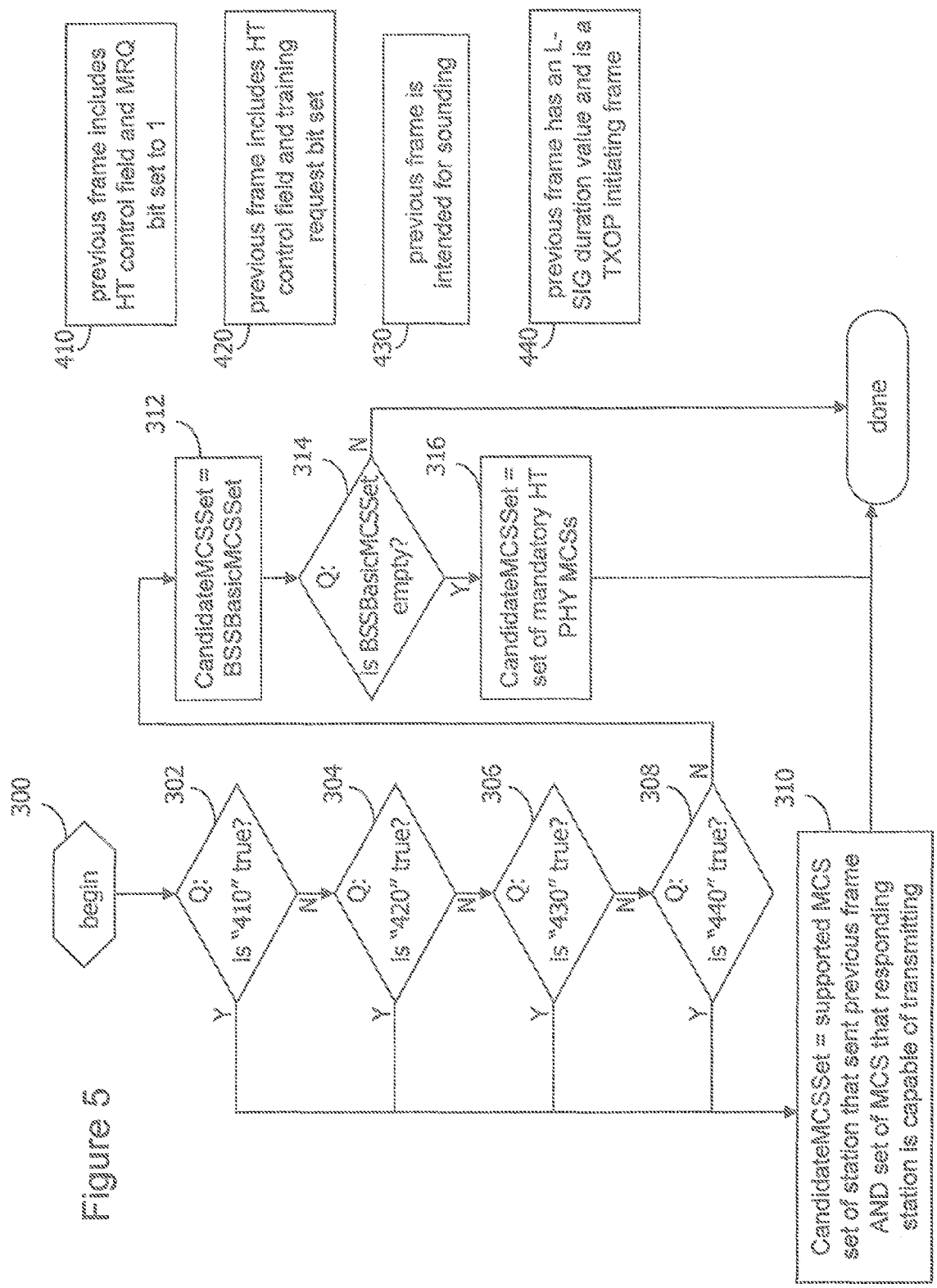
FIG. 5 is a flow diagram of MCS computation performed by the control frame transmission algorithm of FIG. 1, according to some embodiments.

FIG. 5 is a flow diagram depicting operations of the MCS computation routine 300, according to some embodiments. As in FIG. 3, since the MCS computation 300 is a sequence of inquiries, the flow diagram is presented in a simplified "true or false" format, with the specific questions indicated on the right side of FIG. 5, and labeled 410, 420, 430, and 440.

As with the transmission rate selection 200, many of the inquiries made by the MCS computation routine 300 have already been answered in the PPDU format selection 100 analysis. The MCS computation routine 300 defines a "candidate MCS set", CandidateMCSSet, based on the characteristics of the previous frame 120C.

If any of four conditions is true, the CandidateMCSSet is deemed to be a logical conjunction (AND) of the supported MCS set of the station that sent the previous frame (e.g., either the 802.11n device 90B or the legacy device 80B in FIG. 2) and the set of MCS that the responding station is capable of transmitting (e.g., the 802.11n device 90C in FIG. 2) (block 310). In other words, the CandidateMCSSet is a set of MCSs that the transmitting station and the receiving station have in common. The first of the four conditions is when the previous frame includes the HT control field and the MCS request (MRQ) bit set to one (block 302). The second condition is when the previous frame includes an HT control field and the training request bit is set to one (block 304). The third condition is when the previous frame is intended for sounding (block 306). The fourth condition is when the previous frame has an L-SIG duration value and is a transmit operation (TXOP) initiating frame (block 308). Again, if any of these conditions is true, the CandidateMCSSet is deemed to be those MCSs that the sending and receiving stations commonly share.

If none of these conditions is true, the CandidateMCSSet is set to be the basic MCS set of the BSS (e.g., the BSS 70A in FIG. 2), or BSSBasicMCSSet, sort of a default condition (block 312). However, the BSSBasicMCSSet may be empty (the "yes" prong of block 314), in which case the CandidateMCSSet is set to be a set of mandatory HT PHY MCSs (block 316). The operations of the MCS computation 300 are thus complete.

The TGn amendment to the 802.11n specification does not allow using BAR/BA for protection in a mixed environment, such as is depicted in the wireless neighborhood 150 (FIG. 2). Thus, there is no clear definition of which MCS may be used to transmit control frames for training and feedback purposes. The control frame transmission algorithm 500 brings higher client and overall BSS throughput by allowing faster and precise MCS adaptation, and transmits steering by using higher MCS for sounding. The algorithm 500 thus brings better protection in case the legacy and HT devices are associated in the same BSS or in overlapping BSSs by enabling network allocation vector (NAV) protection.

The control frame transmission algorithm 500 defines sending a BAR/BA using the legacy basic rates if there is no need for a training request or response. The algorithm 500 defines sending a BAR/BA, an RTS/CTS, a CTS to self, and an ACK using supported MCS if there is a need for a training request or response.

Figure 6:
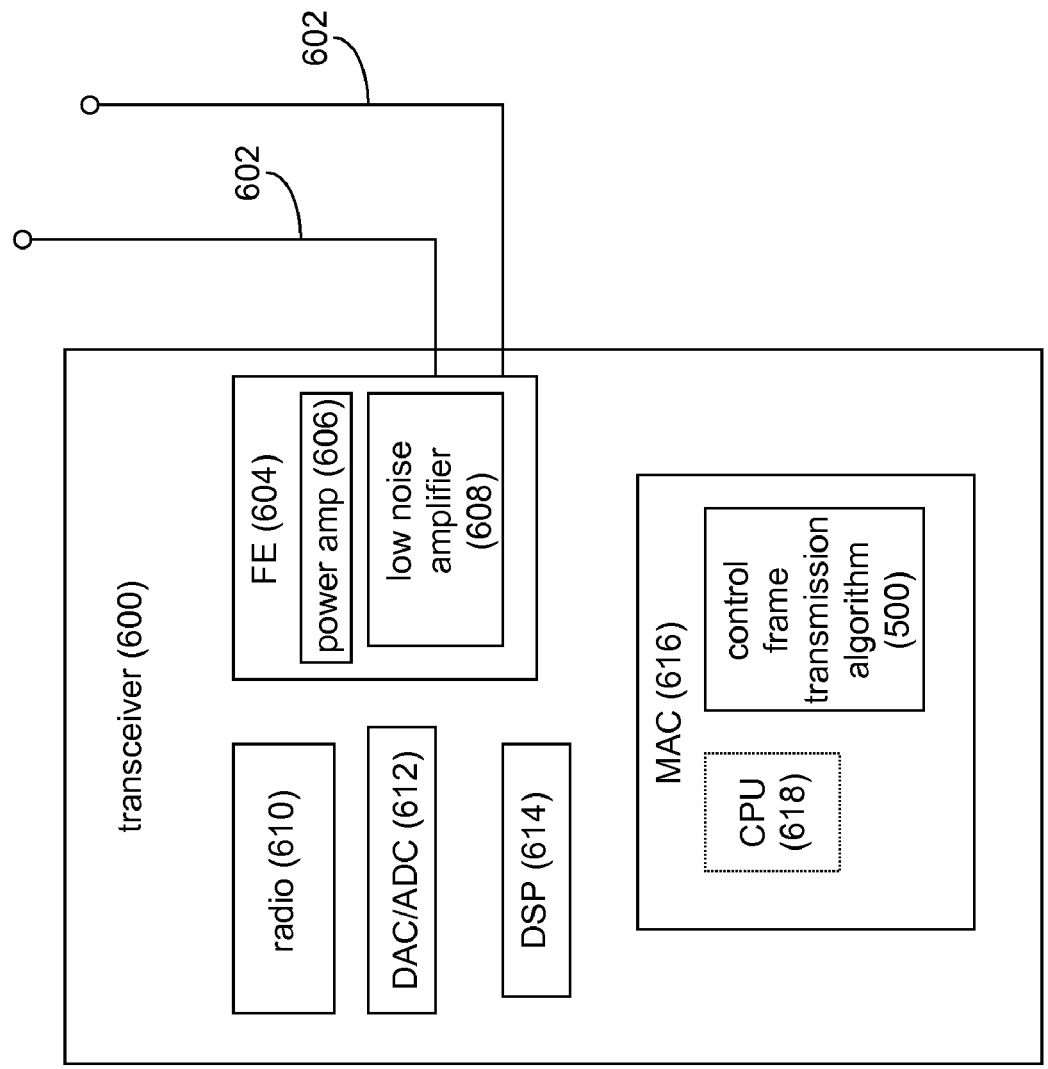
FIG. 6 is a block diagram of a transceiver, including the control frame transmission algorithm of FIG. 1, according to some embodiments.

The algorithm 500 may be operated in transceiver 600, in some embodiments, as depicted in FIG. 6. The transceiver 600 includes one or more antennas 602, for receiving the packets from a STA in the wireless neighborhood 150. The transceiver 600 also includes a front-end (FE) 604, with a power amplifier (606) and a low noise amplifier 608. A radio 610 includes circuitry to invoke the control frame transmission algorithm 500. The transceiver 600 further may include a digital-to-analog/analog-to-digital (DAC/ADC) converter 612, a digital signal processor 614 and a medium access controller (MAC), which optionally includes a dedicated central processing unit (CPU) 618, for executing the control frame transmission algorithm 500. The transceiver may be part of a wireless device, such as one of the devices 80, 90, and/or 110 of FIG. 2, or more generally, part of a transmitter, a receiver, a router, or other circuitry in the wireless neighborhood 150.

While the above has been described with respect to a limited number of embodiments, those skilled in the art will appreciate numerous modifications and variations therefrom. It is intended that the appended claims cover all such modifications and variations as fall within the true spirit and scope of the disclosure.

I claim:

1. A method for transmitting a control frame by a wireless device, the method comprising:
   determining, by the wireless device, that the control frame is either in response to a previous frame having been received, known as a control response frame, or is intended to elicit a response;
   where the control frame is a control response frame:
      transmitting the control response frame using a high-throughput (HT) physical (PHY) layer protocol data unit (PDU) if the previous frame includes a training request;
      transmitting the control response frame using the HT PHY PDU if the previous frame is a request-to-send frame carried in a HT PHY PDU;
      transmitting the control response frame using the HT PHY PDU if the previous frame is sent at a spatial time block coding (STBC) rate while a dual clear-to-send protection bit is set; and
      otherwise, transmitting the control response frame using a non-HT PHY PDU; and
   where the control frame is not a control response frame:
      transmitting the control frame using the HT PHY PDU if the control frame is intended for sounding;
      transmitting the control frame using the HT PHY PDU if the control frame contains a legacy signal duration value;
      transmitting the control frame using the HT PHY PDU if the control frame is to be sent at an STBC rate; and
      otherwise, transmitting the control frame using the non-HT PHY PDU.

2. The method of claim 1, further comprising:
   where the control frame is deemed a control response frame:
      selecting a transmission rate of the control frame, the selecting further comprising:
         attempting to set the transmission rate equal to a highest rate in a basic service set rate set parameter that is less than or equal to a rate of the previous frame when either the control response frame is transmitted in a non-high-throughput PHY protocol data unit or the control frame is deemed a duplicate legacy control frame; and
         setting the transmission rate equal to a highest mandatory rate of the PHY that is less than or equal to the rate of the previous frame and having a modulation class that is equal to that of the previous frame if the attempted transmission rate is unsuccessful.

3. The method of claim 2, further comprising:
   using the modulation coding scheme computation to set the transmission rate when the control response frame is neither transmitted in a non-high-throughput PHY protocol data unit nor deemed a duplicate legacy control frame.

4. The method of claim 2, further comprising:
   determining that the previous frame has one of the following four conditions:
      the previous frame includes a high-throughput control field and a modulation coding scheme request bit set;
      the previous frame includes a high-throughput control field and a training request bit set;
      the previous frame is intended for sounding; or
      the previous frame has a legacy signal duration value and is a transmit operation initiating frame; and
   designating the modulation coding scheme as a set of modulation coding schemes that a station sending the previous frame and a second station transmitting the control response frame have in common.

5. The method of claim 2, further comprising:
   determining that the previous frame has none of four conditions; and
   setting a candidate modulation coding scheme set equal to a basic modulation coding scheme set of a basic service set inside which a station sending the previous frame and a second station transmitting the control response frame reside.

6. The method of claim 5, further comprising:
   determining that the basic modulation coding scheme set is empty; and
   setting the candidate modulation coding scheme set equal to a set of mandatory high-throughput PHY modulation coding schemes.

7. The method of claim 1, further comprising:
   determining that the previous frame is a block ack request; and
   sending a block ack control frame in response.

8. An apparatus, comprising:
   a plurality of antennas and radios to receive and transmit a control frame to or from a wireless device, wherein the apparatus and the wireless device reside in a wireless neighborhood; and
   a media access control unit; comprising a control frame transmission algorithm, wherein the control frame transmission algorithm performs the following steps:
      determining that the control frame is either in response to a previous frame having been received, known as a control response frame, or is intended to elicit a response;
      where the control frame is a control response frame:
         transmitting the control response frame using a high-throughput (HT) physical (PHY) layer protocol data unit (PDU) if the previous frame includes a training request;
         transmitting the control response frame using the HT PHY PDU if the previous frame is a request-to-send frame carried in a HT PHY PDU;
         transmitting the control response frame using the HT PHY PDU if the previous frame is sent at a spatial time block coding (STBC) rate while a dual clear-to-send protection bit is set; and
         otherwise, transmitting the control response frame using a non-HT PHY PDU; and
      where the control frame is not a control response frame:
         transmitting the control frame using the HT PHY PDU if the control frame is intended for sounding;
         transmitting the control frame using the HT PHY PDU if the control frame contains a legacy signal duration value;
         transmitting the control frame using the HT PHY PDU if the control frame is to be sent at an STBC rate; and
         otherwise, transmitting the control frame using the non-HT PHY PDU.

9. The apparatus of claim 8, wherein the control frame transmission algorithm further:
   performs transmission rate selection and modulation coding scheme selection if the control frame is deemed a control response frame.

* * * * *